(12) United States Patent
Matsuo

(10) Patent No.: US 10,284,254 B2
(45) Date of Patent: May 7, 2019

(54) WIRELESS COMMUNICATION DEVICE AND WIRELESS COMMUNICATION METHOD

(71) Applicant: KABUSHIKI KAISHA TOSHIBA, Minato-ku, Tokyo (JP)

(72) Inventor: Ryoko Matsuo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/701,663

(22) Filed: Sep. 12, 2017

(65) Prior Publication Data

US 2018/0269925 A1    Sep. 20, 2018

(30) Foreign Application Priority Data

Mar. 17, 2017   (JP) .................. 2017-053626

(51) Int. Cl.

| | | |
|---|---|---|
| *H04B 1/713* | (2011.01) | |
| *H04B 1/715* | (2011.01) | |
| *H04W 16/14* | (2009.01) | |
| *H04W 36/30* | (2009.01) | |
| *H02J 7/02* | (2016.01) | |
| *H04B 7/06* | (2006.01) | |

(Continued)

(52) U.S. Cl.
CPC .............. *H04B 1/713* (2013.01); *H02J 7/025* (2013.01); *H04B 7/0617* (2013.01); *H04W 36/30* (2013.01); *H04B 2001/7154* (2013.01); *H04W 4/80* (2018.02); *H04W 16/14* (2013.01); *H04W 84/18* (2013.01)

(58) Field of Classification Search
CPC .................. H04B 7/0626; H04B 1/713; H04B 2001/7154; H04L 5/0057; H04W 36/30; H04W 4/80; H04W 16/14; H04W 84/18
See application file for complete search history.

(56) References Cited

U.S. PATENT DOCUMENTS

| | | | |
|---|---|---|---|
| 9,553,473 B2 | 1/2017 | Zeine et al. | |
| 2011/0216846 A1* | 9/2011 | Lee ...................... | H04B 7/0473 375/295 |

(Continued)

FOREIGN PATENT DOCUMENTS

| | | |
|---|---|---|
| JP | 2016-512677 A | 4/2016 |
| WO | WO-2011/083568 A1 | 5/2013 |

*Primary Examiner* — Sung S Ahn
(74) *Attorney, Agent, or Firm* — Foley & Lardner LLP

(57) ABSTRACT

According to one embodiment, a wireless communication device includes a communicator, a transmitter and controlling circuitry. The communicator is communicable using a plurality of first frequency channels. The transmitter transmits a signal using a second frequency channel having a bandwidth larger than that of each of the plurality of first frequency channels. The controlling circuitry selects the first frequency channel, of the plurality of first frequency channels, belonging to a band of the second frequency channel and uses the selected first frequency channel to perform channel estimation to acquire first channel information representing a state of the selected first frequency channel. The controlling circuitry calculates second channel information representing a state of the second frequency channel on a basis of the first channel information and control a directivity of the signal on the basis of the second channel information.

20 Claims, 14 Drawing Sheets

DURING POWER TRANSFERRING

(51) Int. Cl.
*H04W 84/18* (2009.01)
*H04W 4/80* (2018.01)

(56) References Cited

U.S. PATENT DOCUMENTS

| | | |
|---|---|---|
| 2013/0010830 A1 | 1/2013 | Hori et al. |
| 2013/0063082 A1* | 3/2013 | Lee .................. H02J 7/025 320/108 |
| 2014/0159651 A1* | 6/2014 | Von Novak .......... H04B 5/0037 320/108 |
| 2016/0094083 A1 | 3/2016 | Park et al. |
| 2016/0099758 A1 | 4/2016 | Bell et al. |

\* cited by examiner

POWER TRANSFER INTO BLE TERMINAL,
AND BLE COMMUNICATION WITH ANOTHER BLE TERMINAL

WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2017-053626, filed on Mar. 17, 2017, the entire contents of which are incorporated herein by reference.

FIELD

Embodiments described herein relate to a wireless communication device and a wireless communication method.

BACKGROUND

In communication using a BLE (Bluetooth Low Energy) scheme, frequency hopping is adopted in which the communication is performed with a plurality of frequency channels (wireless channels) being sequentially hopped. The frequency channel used for BLE communication is a narrow band channel of 2 MHz width, for example. Adaptive hopping also has been known in which the frequency channel to be used is changed to be adaptive so as to avoid an interfered band. On the other hand, wireless power transfer into the BLE terminal has been considered. In this case, the power transfer using a narrow band frequency channel used for the BLE communication cannot efficiently transfer the power. For this reason, it could be taken into account that a wide band signal is used to perform the efficient power transfer. However, there has been no method for performing the efficient power transfer using a wide band signal for the BLE terminal.

DETAILED DESCRIPTION

According to one embodiment, a wireless communication device includes a communicator, a transmitter and controlling circuitry. The communicator is communicable using a plurality of first frequency channels. The transmitter transmits a signal using a second frequency channel having a bandwidth larger than that of each of the plurality of first frequency channels. The controlling circuitry selects the first frequency channel, of the plurality of first frequency channels, belonging to a band of the second frequency channel and uses the selected first frequency channel to perform channel estimation to acquire first channel information representing a state of the selected first frequency channel. The controlling circuitry calculates second channel information representing a state of the second frequency channel on a basis of the first channel information and control a directivity of the signal on the basis of the second channel information.

Hereinafter, a description is given of an embodiment of the present invention with reference to the drawings.

First Embodiment

Figure 1:
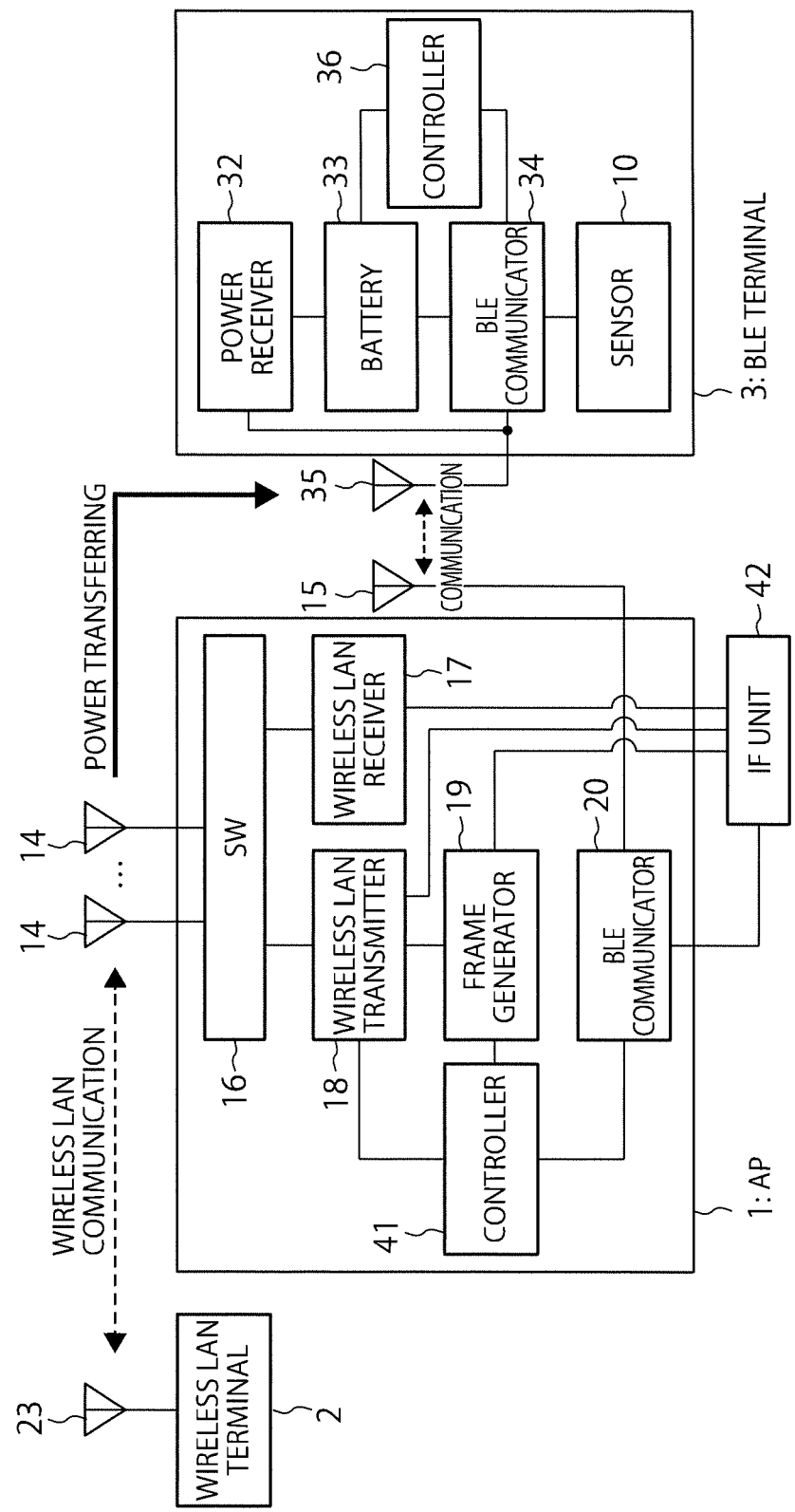
FIG. 1 is a diagram showing a wireless communication system according to an embodiment.

FIG. 1 is a diagram showing a wireless communication system according to an embodiment. The wireless communication system in FIG. 1 includes access points (AP) 1 which is a base station, a wireless LAN terminal 2, and a BLE (Bluetooth Low Energy) terminal 3. The terminal may be referred to as a station (STA). In the figure, one BLE terminal 3 is illustrated, but a plurality of BLE terminals may be used. In the figure, one wireless LAN terminal 2 is illustrated, but two or more wireless LAN terminals 2 may be used. Hereinafter, an outline of the system is described.

The AP 1 is a wireless LAN device complying with the IEEE802.11 standard that is a wireless LAN (Local Area Network) standard, as an example. The IEEE802.11 standard may adopt the IEEE802.11ax standard that is a next generation wireless LAN standard, or a legacy standard (e.g., IEEE802.11ac, IEEE802.11n, IEEE802.11a) previous to that. The AP 1 also performs communication complying with a Bluetooth Low Energy (BLE) scheme, besides a communication scheme of the wireless LAN.

The wireless LAN terminal 2 is a communication device performing wireless LAN communication with the AP 1. The wireless LAN terminal 2 is a camera or LIDAR (Light Detection And Ranging) device having a communication function, for example. In the wireless LAN communication, of a plurality of frequency channels arranged within a predefined wireless LAN band (hereinafter, referred to as a wireless LAN channel), at least one channel (wireless LAN channel) is utilized to perform communication. A bandwidth of the wireless LAN channel is 20 MHz as an example without limitation.

The BLE terminal 3 is a communication device performing BLE communication with the AP 1. A frequency band used for the BLE communication is the same as or overlaps at least of a frequency band used for the wireless LAN communication. In the embodiment, assume a case where a 2.4 GHz band is utilized for the BLE and the wireless LAN as an example. In the BLE communication, a plurality of frequency channels for BLE communication (hereinafter, referred to as a BLE channel) arranged within the frequency band to be used are utilized to perform frequency hopping. Forty BLE channels consist of, as an example, thirty seven data channels used for data communication and three advertisement channels (control channels) used for discovery and connection of a BLE device. A bandwidth of each BLE channel is 2 MHz as an example. A channel width of the BLE channel is narrower than a channel width of the wireless LAN (for example, 20 MHz).

The BLE terminal 3 receives a power transferring wireless LAN signal (power transfer signal) from the AP 1 via an antenna 35 for BLE communication and charges a battery (capacitor or the like) on the basis the received signal (wireless power transfer). The wireless LAN signal is a signal transmitted using the wireless LAN channel. A capacitor may be used as a battery. The BLE terminal 3 operates based on energy accumulated in the capacitor. In FIG. 1, the antenna 35 for BLE communication is used to receive the power transfer signal, but a power transferring antenna may be separately provided and the relevant power transferring antenna may be used to receive the power transfer signal. In this case, the power transferring antenna may be arranged close to the antenna for communication to connect to a power receiver 32. In this case, the antenna 35 for BLE communication may not be connected with the power receiver 32.

The AP 1, which includes one or more antennas, can transmit the power transfer signal whose directivity is directed to the BLE terminal 3 to efficiently transfer the power.

The AP 1 may operate with a battery equipped in itself or may operate on the basis of the power transferred from an external power supply. The wireless LAN terminal 2 may operate with a battery equipped in itself or may operate on the basis of the power transferred from an external power supply. The wireless LAN terminal 2 may receive the power transferring wireless LAN signal (power transfer signal) from the AP 1 and charge the battery equipped in itself on the basis of the received signal, similarly to the BLE terminal 3.

Figure 2:
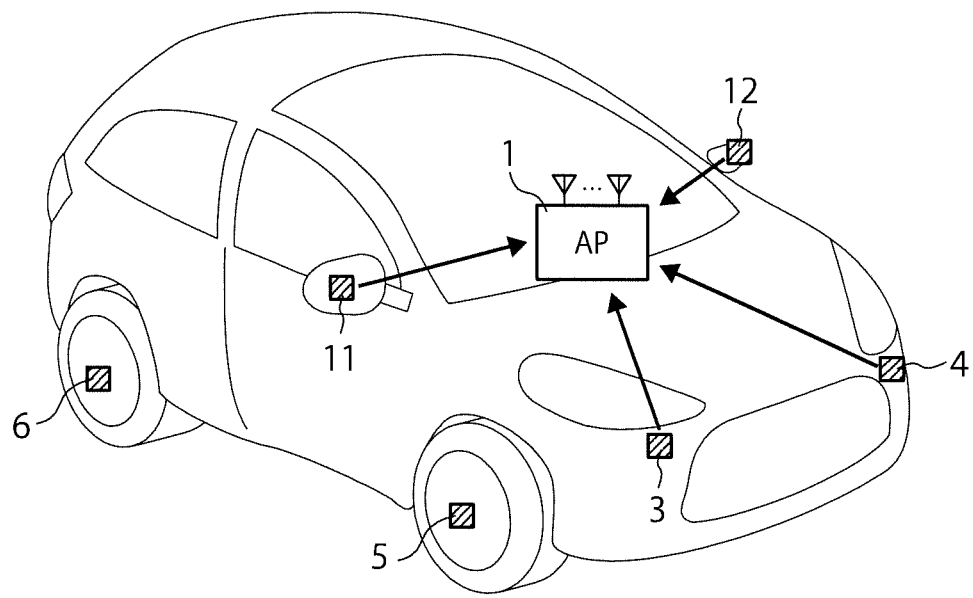
FIG. 2 is a diagram showing an example of the system in FIG. 1 mounted on a motorcar.

The wireless communication system shown in FIG. 1 (AP 1, BLE terminal 3, and wireless LAN terminal 2) may be mounted on a motorcar as an example. FIG. 2 shows an example of the wireless communication system shown in FIG. 1 mounted on a motorcar. The motorcar is an example, and the system may be mounted on a facility in a factory and the like, or other places. In the example in FIG. 2, components 5, 6, 11, and 12 correspond to the BLE terminal and components 3 and 4 correspond to the wireless LAN terminal without limitation. The wireless LAN terminals 3 and 4 are camera devices or the like as an example, and the BLE terminals 5, 6, 11, and 12 are various sensor devices as an example. Examples of the sensor include a tire pressure sensor, an engine temperature sensor, without limitation.

In FIG. 1 or FIG. 2, only the wireless LAN terminal and the BLE terminal are illustrated as communication partners of the AP 1, but other kind of terminals may be present. For example, there may be present a terminal capable of both the wireless LAN and the BLE. In this case, that terminal may receive the power transfer signal from the AP 1 to charge its battery, similarly to the BLE terminal 3. Alternatively, there may be present a terminal using the AP 1 only as an external power transfer device without performing the wireless LAN communication nor the BLE communication. In this case, that terminal receives the power transfer signal from the AP 1 to charge its battery.

The outline of the wireless communication system in FIG. 1 is as described above. Hereinafter, a description is given of details of components of the wireless communication system in FIG. 1.

A wireless communication device equipped in the AP 1 includes a plurality of antennas (wireless LAN antennas) 14 for wireless LAN communication, a switch 16, a wireless LAN receiver 17, a wireless LAN transmitter (transmitter) 18, a frame generator 19, one or more antennas for BLE communication (BLE antennas) 15, a BLE communicator (communicator) 20, a controller (controlling circuitry) 41, and an IF unit 42. A plurality of wireless LAN antennas 14 constitute a phased array antenna as an example. The phased array antenna is an antenna including a plurality of antenna elements and capable of controlling directivity of a transmitted radio wave by controlling a phase of each antenna element.

The switch 16 is a switch for switching the wireless LAN antenna 14 to the wireless LAN transmitter 18 or the wireless LAN receiver 17.

The frame generator 19 generates a MAC frame (hereinafter, referred to as a frame) to be transmitted to the wireless LAN terminal 2. A frame complying with the IEEE802.11 standard is roughly classified into a data frame, a management frame, and a control frame, but any of these may be adopted. A beacon frame the AP 1 periodically transmits for notifying attribute information or synchronization information of the AP 1 is the management frame. The control frame includes an RTS (Request to Send) frame to make a transmission request to a terminal as a communication partner, a CTS (Clear to Send) frame to give a transmission authorization, and an ACK frame or BA (Block Ack) frame that is an acknowledgement frame. These frames mentioned here are examples and there are other various frames.

The wireless LAN transmitter 18 transmits a frame generated by the frame generator 19 via the wireless LAN antenna 14. The frame, to which a header of a physical layer is added in practice, is formed into a packet, and the packet is transmitted. The wireless LAN transmitter 18 subjects the frame (more specifically, the packet) to error-correcting coding and modulation to generate a modulated signal. The modulated signal is converted into an analog signal. The wireless LAN transmitter 18, which uses an oscillator and a PLL (Phase Locked Loop) circuit to generate a signal at a certain frequency, up-converts the analog signal into a signal at a radio frequency by a transmitting mixer on the basis of the relevant signal at the certain frequency. The wireless LAN transmitter 18 amplifies the up-converted signal by an RF amplifier to transmit the amplified signal as the radio wave from the antenna into the space. This allows the frame (packet) at the radio frequency to be transmitted.

The wireless LAN transmitter 18 generates, under control by the controller 41, the power transfer signal as a wireless power transferring signal to transmit the power transfer signal via the wireless LAN antenna 14. More specifically, the wireless LAN transmitter 18 generates the power transfer signal in accordance with a power transfer parameter by the controller 41. The power transfer signal is generated by use of an output signal of the oscillator or output signal of the PLL circuit which are used in transmitting the frame as an example. The power transfer signal can be generated by multiplexing power transferring data corresponding to the power transfer parameter with the relevant output signal by the transmitting mixer. It can be also possible to prepare a signal source for power transfer signal and use the relevant signal source to generate the power transfer signal from the power transfer parameter. In transmitting the power transfer signal, one or more wireless LAN channels are used. In the embodiment, assumed that one wireless LAN channel is used, but a plurality of wireless LAN channels may be used.

The controller 41 controls communications with the wireless LAN terminal 2 and the BLE terminal 3. The controller 41 calculates a weight of a transmission signal for each antenna in order to transmit the power transfer signal whose directivity is controlled. For the calculation of the weight, a result of channel estimation described late is used. A controller 41 performs arithmetic on the basis of the transmission signal for each antenna and the weight for each antenna, and transmits the signal after the arithmetic from each antenna (beam forming). This allows the power transfer signal to be transmitted by way of beam transmission. In a case of the phased array antenna, a setting of a phase shifter for each antenna (for each antenna element) may be adjust on the basis of the calculated weight. This also allows the power transfer signal to be transmitted by way of the beam transmission. The controller 41 controls the modulation scheme or the modulation and coding scheme (MCS). The controller 41 performs selection and control of the wireless LAN channel to be used. In other words, a plurality of channels are arranged within the wireless LAN band, and which channel to use is controlled. A channel extension process may also be performed such that a plurality of wireless LAN channels are coupled to extend a bandwidth. These examples mentioned here are examples and other various controls can be made.

A signal of a frame having a predetermined format can be also used as the power transfer signal with respect to the BLE terminal 3 (and the wireless LAN terminal 2 in a case where wireless LAN terminal 2 is transferred). For example, the signal of the beacon frame can be used as the wireless power transferring signal. Alternatively, the wireless power transferring frame may be configured to be defined to transmit the relevant frame as the power transfer signal.

The controller 41 uses the BLE communicator 20 to control the BLE communication. In the BLE communication, frequency hopping is adopted in which a plurality of channels are sequentially selected to perform communication using the selected channel. A selection order of the channels may be random as an example, but a certain order may be defined. The controller 41 checks a condition of a wireless medium via one or more BLE antennas 15 to determine a channel used between the BLE terminal 3 and itself (BLE channel) on the basis of a result of the check (adaptive frequency hopping). In other words, a plurality of BLE channels to be used are determined so as to avoid interference with other communication.

The AP 1 may specify a different BLE channel used for the communication for each BLE terminal.

The AP 1 may store information on a plurality of BLE channels to be used which are determined for the BLE terminal, in a buffer inside the controller 41 or a storage outside the controller 41. The buffer or the storage may configured by a memory or a storage as an example. The AP 1 may be adequately change the BLE channel used between the BLE terminal and itself depending on a condition of a channel.

In the embodiment, in order to efficiently transfer the BLE terminal 3, the controller 41 performs a process between the BLE terminal 3 and itself (channel information acquisition process) for acquiring a channel condition indicating a condition of the power transferring channel (wireless LAN channel). On the basis of the acquired channel information of the power transferring channel (information such as on amplitude variation information and phase variation information), the controller 41 calculates a weight for forming the directivity to the BLE terminal 3 and uses the relevant weight to transmit the power transfer signal.

In the embodiment, the channel information of the power transferring channel (wireless LAN channel) is acquired by utilizing the channel estimation of the BLE channel as one characteristic. The channel estimation refers to an investigation of characteristics of a channel (propagation path) by measuring the amplitude variation, phase variation and the like of a known signal which is received through the channel.

Concretely, first, the AP 1 selects at least one or more of a plurality of BLE channels belonging to the same band as the power transferring channel (wireless LAN channel) and makes the BLE terminal transmit a known signal using each selected BLE channel. The AP 1 performs the channel estimation on the basis of the known signal to acquire the channel information that is a channel estimation result of the BLE channel. The AP 1 utilizes the acquired channel information for performing the arithmetic to calculate the channel information of the wireless LAN channel. As an example, an average value of the channel information of a plurality of BLE channels may be used as the channel information of the power transferring channel (wireless LAN channel). This allows the controller 41 acquire the channel information of the power transferring channel (wireless LAN channel) between itself and the BLE terminal 3 not performing the wireless LAN communication. The controller 41 utilizes the acquired channel information of the power transferring channel (wireless LAN channel) to calculate a weight for forming a directional beam for the BLE terminal 3 and uses the calculated weight to transmit the power transfer signal. The channel information acquired in this way is uplink channel information from the BLE terminal 3 to the AP 1, but, assuming symmetry of the channel, even in a case of downlink transmission from the AP 1 to the BLE terminal 3, this channel information can be used to form a proper directional beam.

The wireless LAN receiver 17 decodes the signal received from the wireless LAN terminal 2 to acquire the frame. More specifically, the signal received by the antenna is input to the wireless LAN receiver 17. The wireless LAN receiver 17 amplifies the received signal by use of an LNA (Low Noise Amplifier) amplifier. The wireless LAN receiver 17 down-converts the amplified signal on the basis of the signal at a certain frequency generated by the oscillator and the PLL circuit. On the basis of the down-converted signal, a filter for reception is used to extract a signal having a desired band. The wireless LAN receiver 17 demodulates and decodes the extracted signal to acquire a frame (more specifically, a packet).

If the acquired frame is a data frame, the wireless LAN receiver 17 outputs data contained in the data frame from the IF unit 42. The IF unit 42 is an interface for outputting the frame received by the wireless LAN receiver 17 to an upper layer or a buffer between the upper layer and itself. The wireless LAN receiver 17 outputs an analysis result of the frame to the frame generator 19 or the controller 41 in order to perform an operation depending on a kind of the received frame. For example, in a case of an acknowledgement response, information required for the acknowledgement response is output to any one or both of the frame generator 19 or the controller 41 or both such that the acknowledgement response frame is transmitted after elapse of a certain time period from the completion of the reception.

The BLE communicator 20, which is connected with the controller 41, performs the BLE communication under the control by the controller 41. In other words, the BLE communicator 20 communicates with the BLE terminal 3 via the BLE antenna 15 using a plurality of BLE channels. As an example, the BLE communicator 20 receives data such as sensor data or various pieces of information from the BLE terminal 3. The BLE communicator 20 transmits various pieces of instruction information or control information to the BLE terminal 3. Examples of the information received from the BLE communicator 20 include information on the power transfer. Examples of the information on the power transfer include information on remaining battery charge, information on an amount of received power transferred from the AP 1 (received power amount information), and information on a power transfer environment (in a case of the system mounted on motorcar, change of the number of persons in the motorcar or the like, open or close of a door, and so on).

The wireless LAN terminal 2 transmits and receives a frame through the wireless LAN to and from the AP 1 via one or more antennas 23. If the wireless LAN terminal 2 has a configuration capable of the wireless power transfer from the AP 1, it may receive the power transfer signal from the AP 1 to charge a battery in itself on the basis of the power transfer signal.

A wireless communication device equipped in the BLE terminal 3 includes the power receiver 32, a battery 33, a BLE communicator 34, one or more antennas 35 for BLE (BLE antennas), a controller 36, and a sensor 10. The power receiver 32 receives the power transfer signal transmitted from the AP 1 via the BLE antenna 35 with the directivity of the power transfer signal being directed to itself and rectifies (converts) the received power transfer signal into an direct current. The power receiver 32 charges the battery 33 with the converted direct signal. The battery 33 is a capacitor as an example. A set of the antenna 35 and the power receiver 32 corresponds to a rectenna.

The controller 36 controls the BLE communication with the AP 1 via the BLE communicator 34. The controller 36 has a measure function of measuring an amount of power (amount of received power) transferred from the AP 1 or measuring the remaining battery charge. The amount of power refers to an electrical energy amount or a quantity of electric charge.

The amount of received power may be arbitrarily measured. For example, the amount of received power may be measured depending on variation of a voltage of a capacitor before and after measurement. More specifically, the amount of received power may be measured from a voltage difference and a capacitance value.

The BLE communicator 34 performs communication complying with the BLE. The BLE communicator 34 transmits data such as the sensor data or various pieces of information to the AP 1 via the BLE antenna 35. Example of the transmitted information include the information on amount of received power, and the information on the remaining battery charge which are described above. In addition, the controller 36 may calculate the power transfer efficiency such that the BLE communicator 34 transmits a value of the relevant calculated power transfer efficiency. The power transfer efficiency can be calculated by a ratio of the amount of received power relative to an amount of transmitted power of the AP 1 as an example. In this case, a value of the amount of transmitted power may be notified from the AP 1 in advance or may be determined in a system specification or the like in advance. If the amount of received power, the remaining battery charge, the power transfer efficiency, or the power transferring environment does not meet a predefined condition, the controller 36 may transmit a request for the channel estimation of the power transferring channel (wireless LAN channel) to the AP 1 via the BLE communicator 34.

Figure 3:
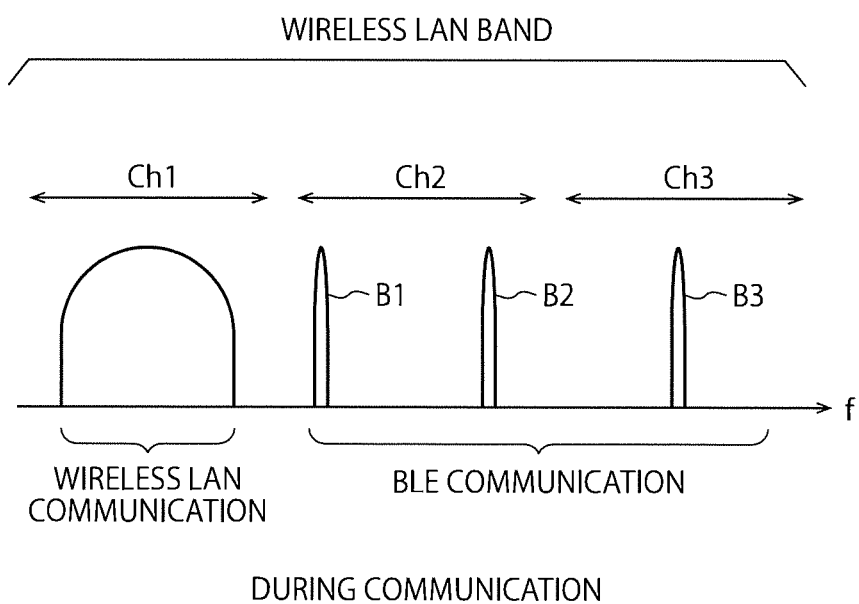
FIG. 3 is a schematic view for illustrating an outline of an operation of an access point (AP)
Figure 4:
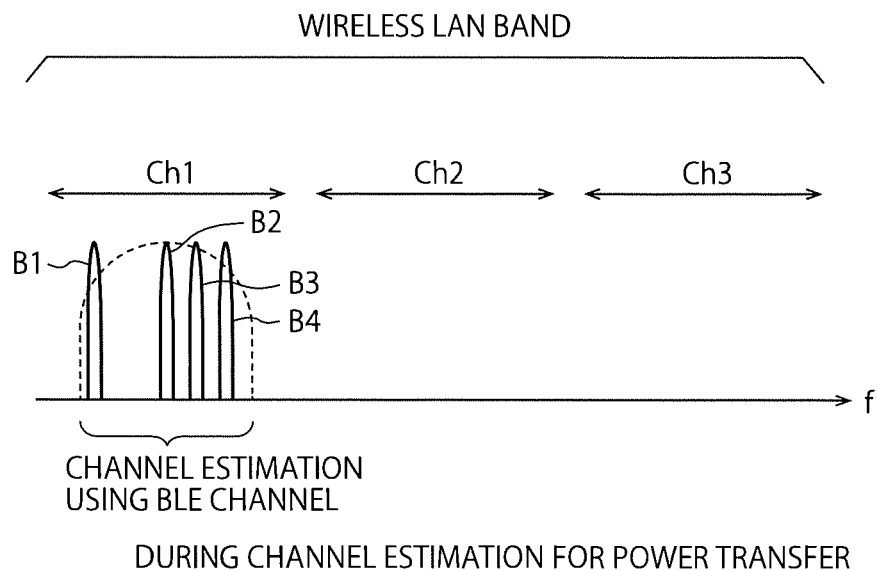
FIG. 4 is a schematic view for illustrating an outline of an operation of an AP.
Figure 5:
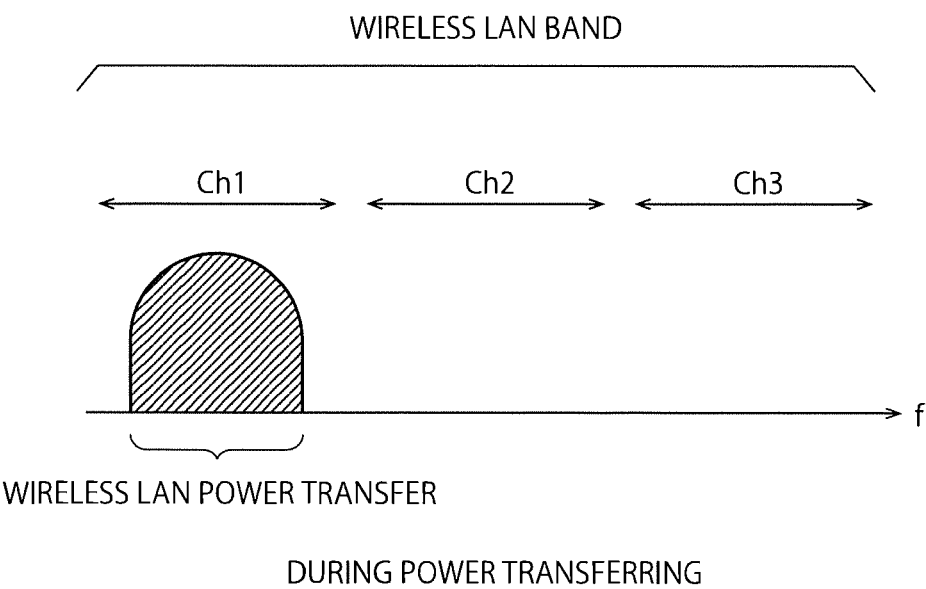
FIG. 5 is a schematic view for illustrating an outline of an operation of an AP.

FIG. 3, FIG. 4, and FIG. 5 are each a schematic view for illustrating an outline of an operation of the AP 1. The AP 1 performs roughly a operation of the BLE communication with the BLE terminal 3 and the wireless LAN communication with the wireless LAN terminal 2 (FIG. 3), an operation of acquiring the channel information of the power transferring channel between the BLE terminal 3 and itself (FIG. 4), and an operation of the wireless power transfer into the BLE terminal 3 (FIG. 5).

As shown in FIG. 3, three wireless LAN channels (Ch1, Ch2, and Ch3) are arranged within the wireless LAN band. The AP 1 utilizes the wireless LAN channel Ch1 of these wireless LAN channels for the communication with and the power transfer into the wireless LAN terminal 2 (and other wireless LAN terminals not shown). A plurality of BLE channels are arranged at a certain interval across the whole wireless LAN band (band of Ch1 to Ch3) (not shown). A bandwidth of the wireless LAN channel is 20 MHz, for example, and a bandwidth of the BLE channel is 2 MHz, for example. The AP 1 selects, from among these BLE channels, a BLE channel not overlapping the wireless LAN channel Ch1 (BLE channels B1, B2, and B3 in the example shown in the figure) for the communication with the BLE terminal 3. The AP 1 uses the selected BLE channels B1 to B3 as data channels to communicate with the BLE terminal 3 while switching these channels with channel hopping. Since a frequency used for the wireless LAN communication is different from a frequency used for the BLE communication, the wireless LAN communication and the BLE communication can be simultaneously (in parallel) performed. In the figure, three BLE channels are represented as the channels used for the BLE communication, but more BLE channels may be utilized in practice.

As shown in FIG. 4, the AP 1 performs the channel estimation using one or more BLE channels belonging to the band of the wireless LAN channel Ch1 to acquire the channel information in a case of power transferring using the channel Ch1 into the BLE terminal 3 not having the wireless LAN transmitter and receiver. More specifically, the AP 1 selects one or more BLE channels as candidate channels from among the BLE channels belonging to the band of the wireless LAN channel Ch1. Here, the BLE channels B1, B2, B3, and B4 are selected. The AP 1 performs the channel estimation using the respective BLE channels B1, B2, B3, and B4 between the BLE terminal 3 and itself while switching the channels.

Concretely, list information containing identifiers of the selected candidate channels (BLE channels) B1 to B4 is notified to the BLE terminal 3 via the BLE antenna 15. The BLE terminal 3 receives the relevant list information via the antenna 35, selects all or a part of the candidate channels specified in the list information, and transmits the known signal to the AP 1 using each of the selected candidate channels. The AP 1 uses the candidate channel through which the known signal is received to perform the channel estimation on the basis of the relevant received known signal (measure the amplitude change and the phase change), and thereby, calculates the channel information of the candidate channel (BLE channel). Here, assume that the BLE terminal 3 transmits the known signal while switching the BLE channels B1 to B4 with the channel hopping and the AP 1 receives the known signal using each of the BLE channels B1 to B4, and then, the channel information of each of the BLE channels B1 to B4 is acquired.

The AP 1 uses the channel information of the BLE channels B1 to B4 to calculate the channel information of the wireless LAN channel Ch1. As an example, calculated are average values of the channel information of the BLE channels B1 to B4 (an average value of the amplitude variation and an average value of the phase variation). However, this is only an example, and another method may be used to calculate the channel information of the wireless LAN channel Ch1. A weighting may be set to each of the BLE channels B1 to B4 to calculate a weighting average of the channel information of the BLE channels B1 to B4. Alternatively, one selected from among the BLE channels B1 to B4 may be selected as a representative channel to adopt channel information of the representative channel information as the channel information of the wireless LAN channel Ch1. Alternatively, a channel only, of the BEL channels B1 to B4, which is significantly different in its characteristic may be eliminated to perform the calculation.

Figure 6:
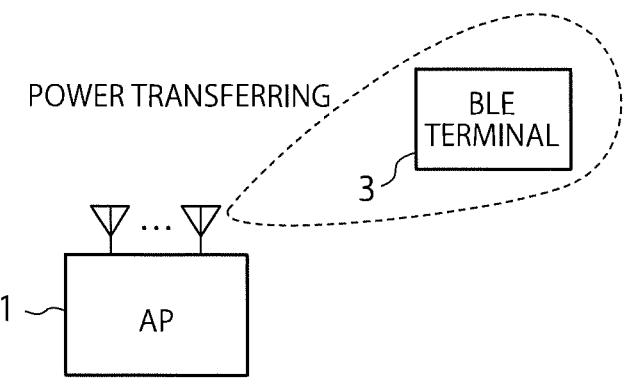
FIG. 6 is a diagram schematically showing a manner of transmitting a power transfer signal to a BLE terminal by directivity control.

As shown in FIG. 5, the AP 1 calculates the weight for directing the directivity to the BLE terminal 3 for each antenna 14 on the basis of the channel information of the wireless LAN channel Ch1, and controls the directivity on the basis of the calculated weight to transmit the power transfer signal. Concretely, the AP 1 performs the arithmetic for the beam forming on the basis of the transmission signal for each antenna 14 and the weight for each antenna 14, and DA-converts and amplifies the signals after the arithmetic to transmit via the respective antennas 14. In a case of the phased array antenna, a weight to be set in a phase shifter corresponding to each antenna 14 (each antenna element) is calculated to set the calculated weight value in the phase shifter. Then, a transmission signal corresponding to each antenna element is transmitted (the transmission signal may have the same content, or may be adjusted in its amplitude and the like for each antenna element). In this way, any method can be used to transmit the power transfer signal whose directivity is controlled (the power transfer signal can be transmitted by way of the beam transmission). In the figure, hatching indicates that the power transfer not the communication is being performed. FIG. 6 shows a manner of transmitting the power transfer signal whose directivity is controlled to the BLE terminal 3.

Figure 7:
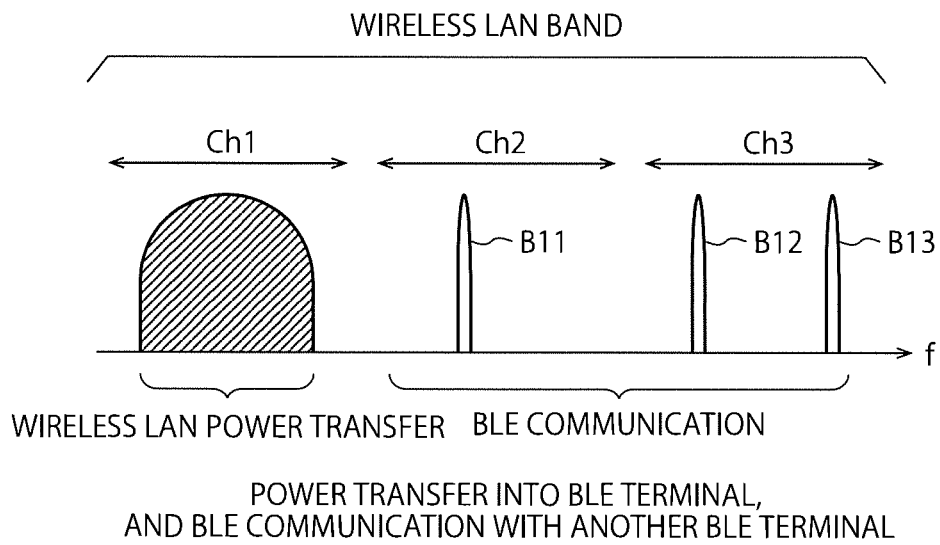
FIG. 7 is diagram illustrating an example of power transferring into a BLE terminal and, at the same time, performing BLE communication with another BLE terminal.
Figure 8:
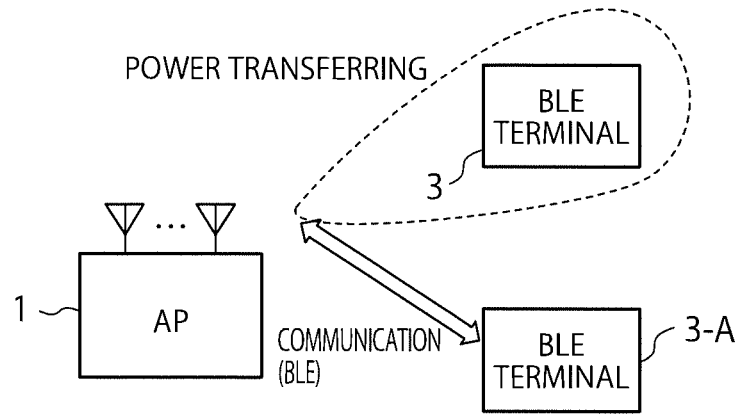
FIG. 8 is a diagram schematically showing a manner of transmitting a power transfer signal to a BLE terminal by the directivity control and, at the same time, performing the BLE communication with another BLE terminal.

The AP 1, during the power transfer into the BLE terminal 3, can perform also the BLE communication with another BLE terminal. In other words, as shown in FIG. 7, during the power transfer into the BLE terminal 3 using the wireless LAN channel Ch1, the BLE channel belonging to other band than that of the wireless LAN channel Ch1 (BLE channels B11, B12, and B13 in the example shown in the figure) may be used to perform the BLE communication with another BLE terminal. FIG. 8 shows a manner of transmitting the power transfer signal to the BLE terminal 3 by way of the beam transmission and, at the same time, communicating with a BLE terminal 3-A by the BLE.

Figure 9:
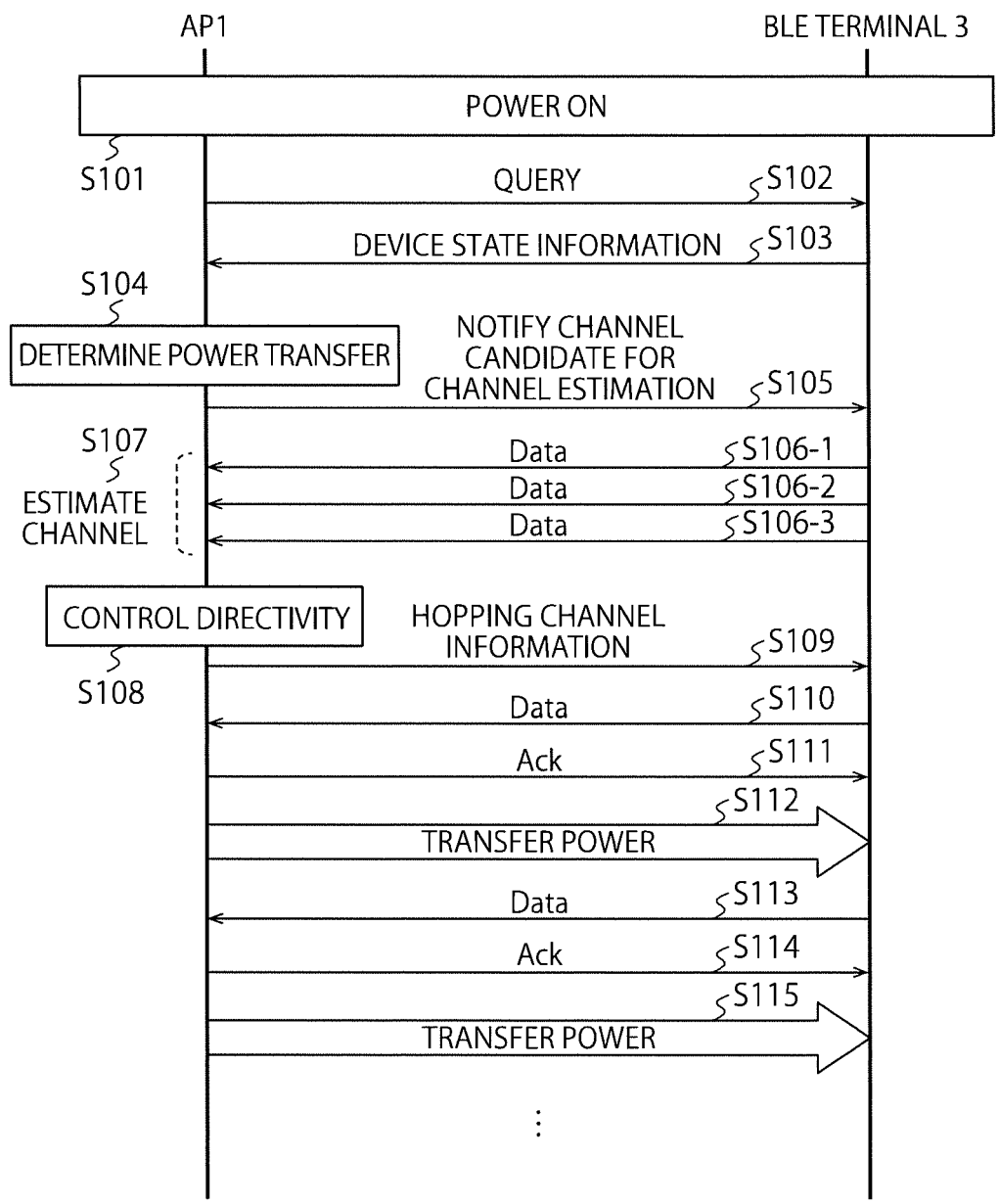
FIG. 9 is a diagram showing an operation sequence between an AP and a BLE terminal according to the embodiment.

FIG. 9 shows an operation sequence between the AP 1 and the BLE terminal 3 according to the embodiment. Both the AP 1 and the BLE terminal 3 are powered on to be put into an activated state (S101), and then, start their operations. The operations such as discovery of the BLE terminal 3 and connection of the BLE terminal 3 are performed between the AP 1 and the BLE terminal 3 via the advertisement channel for the BLE.

The AP 1 transmits to the BLE terminal 3 a query message requesting to transmit device state information required for determining power transfer necessity (S102). The query message is transmitted by way of the BLE communication. Examples of the device state information include the information of the remaining battery charge of the BLE terminal 3. The BLE terminal 3 may determine the power transfer necessity to transmit information representing a result of the determination to the AP 1. In this case, the relevant result information of the determination is adopted as transmission device state information. The BLE terminal 3 transmits the device state information requested from the AP 1 by way of the BLE to the AP 1 (S103).

The AP 1 determines whether or not the power transfer into the BLE terminal 3 is necessary on the basis of the device state information received from the BLE terminal 3 by way of the BLE (S104). If determining not necessary, the operation may be performed again from step S102 after that when a predefined condition is met. The predefined condition can be variously considered and examples thereof include a case where the remaining battery charge of the BLE terminal 3 falls below a threshold, a case where the power transfer efficiency from the AP 1 to the BLE terminal 3 falls below a threshold, and a case where an explicit request for the power transfer is received from the BLE terminal 3.

On the other hand, if the AP 1 determines that the power transfer into the BLE terminal 3 is necessary on the basis of the device state information, it selects one or more channels as the candidate channels for the channel estimation from among a plurality of BLE channels belonging to the band of the power transferring wireless LAN channel (e.g., wireless LAN channel Ch1). The AP 1 transmits the information (list information) representing the identifiers of the selected candidate channels to the BLE terminal 3 by way of the BLE (S105). In other words, the AP 1 notifies the channel candidates for the channel estimation. The communication at S102 to S105 is performed with the frequency hopping as an example. In this case, any BLE channel may be selected from the BLE channels (data channels) included within the whole frequency band for BLE communication, or the AP 1 may select some BLE channels to be used with respect to the BLE terminal 3 in advance in any method to notify the selected BLE channels to the BLE terminal 3. Other method than those described here may be used for determining the BLE channel to be used.

The BLE terminal 3 selects at least one or more (or all) of the candidate channels described in the list information received from the AP 1 to transmit a predefined known signal using each of the selected candidate channels (S106-1, S106-2, and S106-3). The known signal may be determined in advance in the system specification or standard or the like. Alternatively, the AP 1 may notify information representing the known signal together with the list information to the BLE terminal 3.

The AP 1 receives the known signal transmitted from the BLE terminal 3 and performs the channel estimation on the basis of the received known signal to calculate the channel information of the candidate channel (BLE channel) through which the relevant known signal is received (S107). Note that in a case where the AP 1 receives the signals through all candidate channels described in the list information or in a case where a certain time period elapses from the channel candidate notification (S105), the operation proceeds to the next process (S108).

The AP 1 uses the channel information of the candidate channel (BLE channel) to calculate the channel information of the power transferring channel (wireless LAN channel Ch1). As an example, as described above, the average value of the channel information of the candidate channel (the average value of the amplitude variation and the average value of the phase variation) may be calculated as the channel information of the power transferring channel. Alternatively, the weighting average of the channel information of the candidate channels may be calculated, or one representative channel may be selected from the candidate channels to adopt the channel information of the representative channel as the channel information of the wireless LAN channel Ch1.

The AP 1 calculates the weight for directing the directivity to the BLE terminal for each of a plurality of wireless LAN antennas 14 on the basis of the channel information of the wireless LAN channel Ch1 (S108). In the case of the phased array antenna, at this time, the phase shifter corresponding to each antenna element may be adjusted (array adjustment) on the basis of the calculated weight. Alternatively, the array adjustment may be carried out in performing the power transfer.

The AP 1 determines with respect to the BLE terminal 3 a plurality of BLE channels used for the data communication, and notifies information specifying the determined plural BLE channels (hopping channel information) to the BLE terminal 3 (S109). The AP 1 selects, as a plurality of BLE channel used for the data communication, a BLE channel not belonging to the band of the power transferring wireless LAN channel Ch1 as an example. If a table associating patterns of a plurality of BLE channels to be used with pattern identifiers thereof is shared in advance, the pattern identifier may be notified as the hopping channel information to the BLE terminal 3.

The BLE terminal 3 uses a plurality of BLE channels represented in the hopping channel information notified by the AP 1 to transmit the data to the AP 1 with the frequency hopping (S110).

The AP 1 subjects the data received from the BLE terminal 3 to error check and transmits the acknowledgement response (Ack) depending on a check result (S111). After transmitting the acknowledgement response, the AP 1 starts the power transfer into the BLE terminal 3 (S112). In other words, the AP 1 transmits the power transfer signal whose directivity is directed to the BLE terminal 3 on the basis of the weight determined at step S108. A timing of performing the wireless power transfer may be timing after elapse of a predetermined time period from receiving the acknowledgement response or another timing determined in advance. In performing the wireless power transfer, the AP 1 may confirm in advance that the wireless medium in the wireless LAN channel Ch1 is in an idle state by a carrier sense.

Subsequently, the data transmission, the acknowledgement response transmission, and the wireless power transfer are similarly repeated between the AP 1 and the BLE terminal 3 (S113, S114, and S115).

After that, the AP 1 or the BLE terminal 3 determines whether or not the channel estimation needs to be performed. For example, as is described above, the channel estimation is determined to be performed in a case where the remaining battery charge of the BLE terminal 3 falls below a threshold, a case where the power transfer efficiency from the AP 1 to the BLE terminal 3 falls below a threshold, and the like. In this case, the process similar to steps S105 to S107 may be performed. In other words, the AP 1 notifies one or more candidate channels to the BLE terminal 3, and the BLE terminal 3 selects all or one or more of the notified candidate channels to transmit the known signal using the selected candidate channels. The AP 1 receives the known signal transmitted from the BLE terminal 3 and performs, on the received known signal, the channel estimation of the candidate channel (BLE channel) through which the known signal is transmitted. The AP 1 calculates the channel information of the power transferring channel (wireless LAN channel Ch1) from the channel information that is a channel estimation result of the candidate channel. Subsequently, the AP 1 utilizes the channel information of the power transferring channel to control the directivity, and thereby, transmits the power transfer signal to the BLE terminal 3. This allows the efficient wireless power transfer into the BLE terminal 3.

Figure 10:
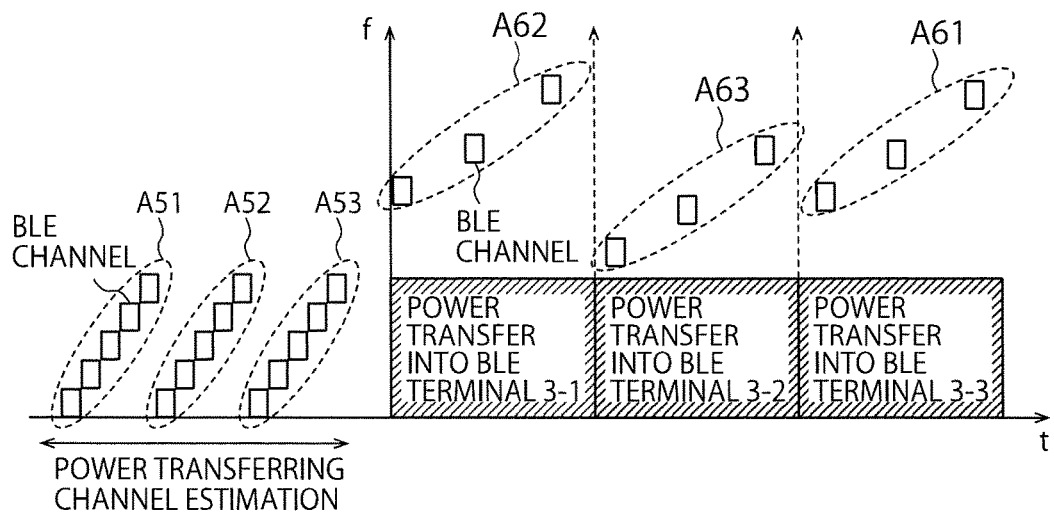
FIG. 10 is a diagram schematically showing an exemplary operation in a case where an AP performs the BLE communication with three BLE terminals and wireless power transfer thereinto.

In FIG. 9, only one BLE terminal is illustrated, but there may be a plurality of BLE terminals, each of which may perform the operation sequence similar to in FIG. 9 with respect to the AP 1. In this case, as shown above in FIG. 7 and FIG. 8, the AP 1 transfers one BLE terminal and, at the same time, can perform also the BLE communication with another BLE terminal. An exemplary operation in this case is described with reference to FIG. 10. FIG. 10 shows an exemplary operation in a case where the AP 1 performs the BLE communication with three BLE terminals and wireless power transfer thereinto on a predetermined schedule. Non-filled small rectangles schematically represent the BLE channels.

In the example in FIG. 10, the AP 1 wirelessly connects with a BLE terminal 3-1, a BLE terminal 3-2, and a BLE terminal 3-3. The AP 1 performs the channel estimation (A51 in the figure) between the BLE terminal 3-1 and a plurality of candidate channels (five BLE channels in the figure), and, on the basis of a result of the estimation, calculates the channel information of the power transferring channel (wireless LAN channel Ch1). Similarly, the AP 1 performs the channel estimations (A52 and A53 in the figure) respectively between the BLE terminals 3-2 and 3-3 and a plurality of candidate channels (the same BLE channels as for the BLE terminal 3-1 in the figure), and, on the basis of results of the estimations, calculates the channel information of the power transferring channel (wireless LAN channel Ch1). This operation corresponds to a case where steps S105 to S107 in FIG. 9 are performed for the BLE terminals 3-1 to 3-3 in this order. The AP 1 determines a plurality of BLE channels used in BLE data communication between these BLE terminals 3-1 to 3-3 and itself, and notifies the hopping channel information specifying the determined plural BLE channels to the respective BLE terminals. The BLE channels specified for the respective BLE terminals may be the same as or different from each other. The AP 1 determines a BLE channel not belonging to the band of the power transferring channel (wireless LAN channel Ch1).

Figure 11:
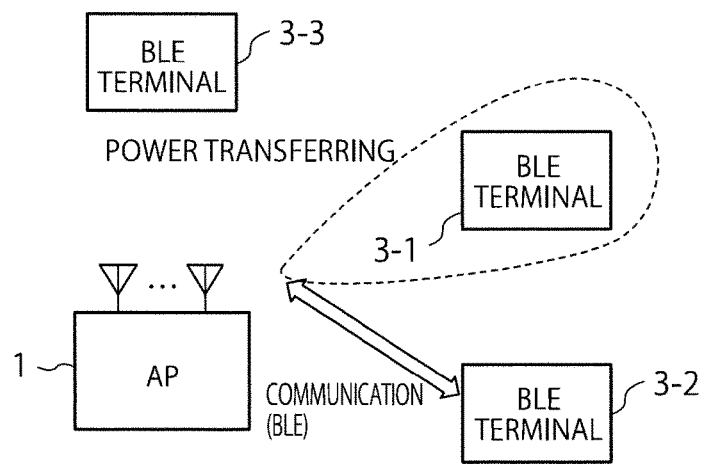
FIG. 11 is an example in which an AP performs the wireless power transfer into one BLE terminal and, at the same time, performs the BLE communication with another BLE terminal.

After that, the AP 1 schedules so that it performs the wireless power transfer into one BLE terminal and, at the same time, performs the BLE data communication with another one BLE terminal, and thereafter, operates on that schedule. In the example shown in the figure, first, the AP 1 transfers the BLE terminal 3-1 using the power transferring channel 1 and, at the same time, performs the BLE communication with the BLE terminal 3-2 (A62 in the figure). A state in this operation is schematically shown in FIG. 11.

Figure 12:
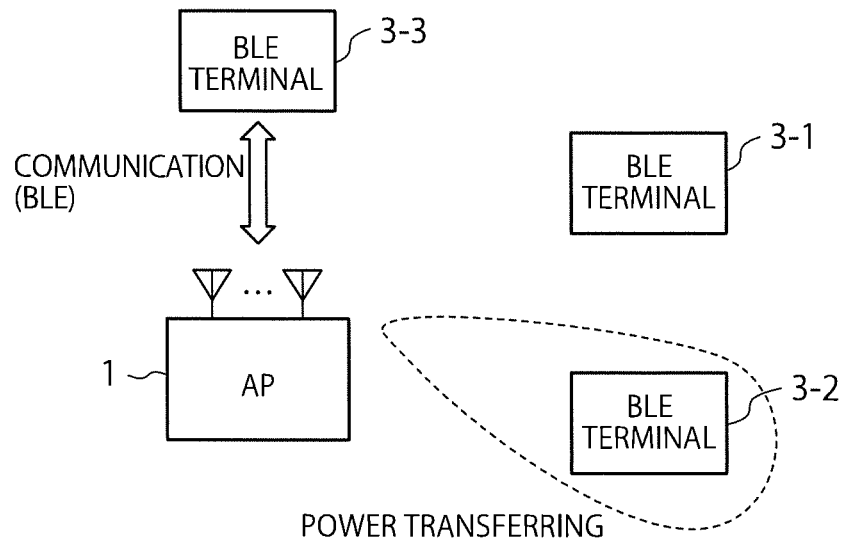
FIG. 12 is an example in which an AP performs the wireless power transfer into one BLE terminal and, at the same time, performs the BLE communication with another BLE terminal.

After elapse of a certain time period, the AP 1 performs simultaneously the wireless power transfer into the BLE terminal 3-2 and the BLE data communication with the BLE terminal 3-3 (A63 in FIG. 10). A state in this operation is schematically shown in FIG. 12.

Figure 13:
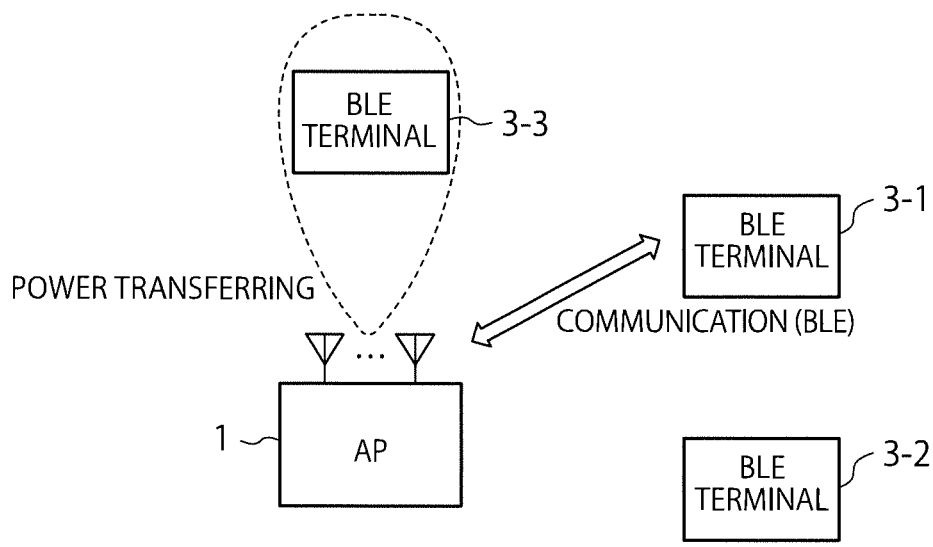
FIG. 13 is an example in which an AP performs the wireless power transfer into one BLE terminal and, at the same time, performs the BLE communication with another BLE terminal.

After further elapse of a certain time period, the AP 1 performs simultaneously the wireless power transfer into the BLE terminal 3-3 and the BLE data communication with the BLE terminal 3-3 (A61 in FIG. 10). A state in this operation is schematically shown in FIG. 13.

In the example illustrated in FIG. 10 to FIG. 13, both the number of the BEL terminals into which the wireless power transfer is performed and the number of the BEL terminals with which the BEL communication is performed are one, but are not necessarily limited to one. For example, the power transfer into two BEL terminals may be simultaneously performed while the communication with one or two or more BEL terminals is performed. In the case of the simultaneous power transfer into two BEL terminals, the directivity of the power transfer signal may be controlled so as to obtain a gain for each of two BEL terminals.

In the embodiment described above, a BLE channel belonging to the band of the wireless LAN channel Ch1 used for the wireless power transfer is not used for the data communication. In other words, a BLE channel belonging to other band than that of the wireless LAN channel Ch1 is used to perform the BLE data communication. However, unless the wireless power transfer and the BLE communication are simultaneously performed, that is, if the wireless power transfer is not performed during the BLE communication, the entire area for the wireless LAN including the band of the wireless LAN channel Ch1 may be used for the BLE communication during a time except for a power transfer period. An exemplary operation in this case is described with reference to FIG. 14 (A to FIG. 15B.

Figure 14A:
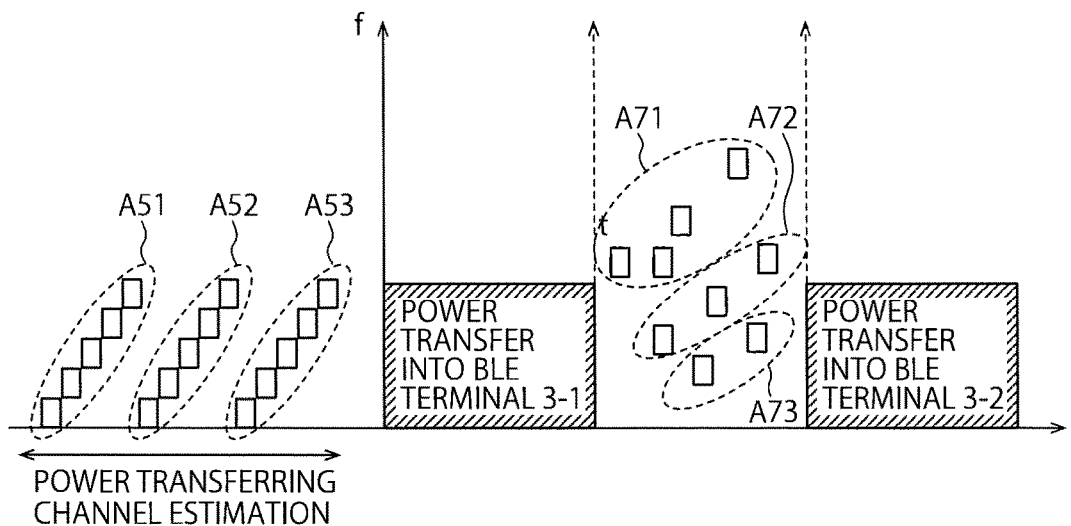
FIG. 14A and FIG. 14B are each a diagram for illustrating another exemplary operation in a case where an AP performs the BLE communication with three BLE terminals and the wireless power transfer thereinto.
Figure 14B:
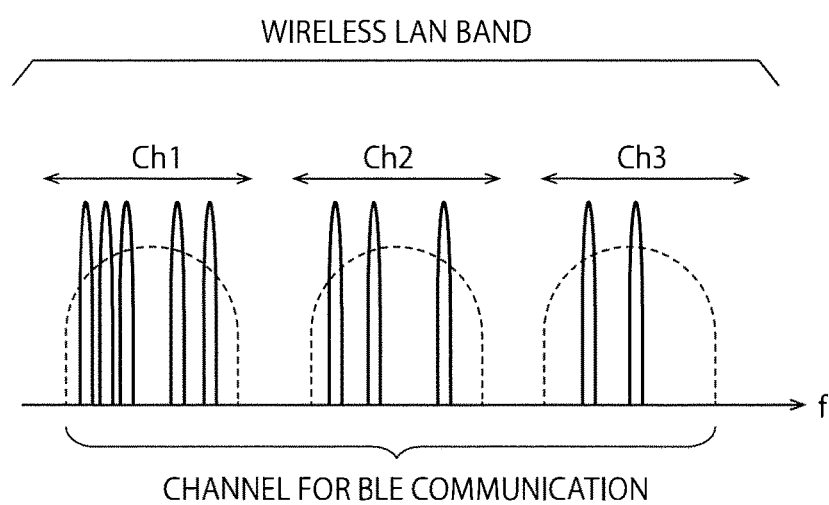

FIG. 14A and FIG. 14B are each a diagram for illustrating another exemplary operation in a case where the AP 1 performs the BLE communication with three BLE terminals and the wireless power transfer thereinto. The operation until the channel information of the power transferring channel (wireless LAN channel Ch1) is acquired is the same as in FIG. 10. In determining the BLE channel used for the data communication with each of the BLE terminals, the AP 1 can select a BLE channel from the BLE channels belonging to the whole wireless LAN band including the band of the wireless LAN channel Ch1. FIG. 14B shows an example of the BLE channels which can be used for the BLE communication. The BLE channels are arranged across the whole wireless LAN band, and the BLE channels belonging to the band of the wireless LAN channel Ch1 used for the wireless power transfer can be also utilized. The AP 1 determines the BLE channel used for the data communication with each BLE terminal on the basis of these BLE channels, and notifies the hopping channel information specifying the determined BLE channel to each BLE terminal.

Figure 15A:
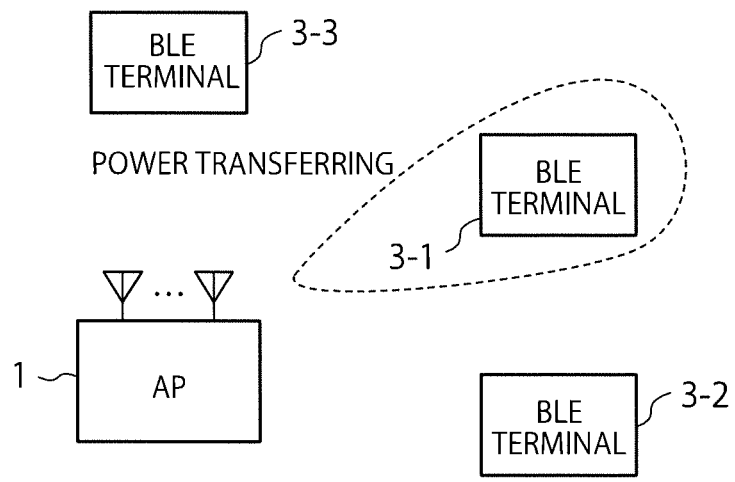
FIG. 15A and FIG. 15B are each a diagram for illustrating an exemplary operation in which the wireless power transfer is not performed during the BLE communication.
Figure 15B:
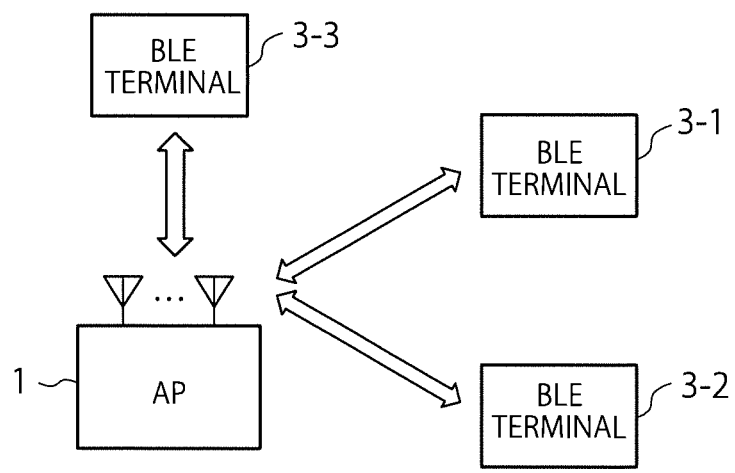

Consider a case where after that the AP 1 performs the wireless power transfer into the BLE terminal 3-1. During the wireless power transfer into the BLE terminal 3-1, the AP 1 performs the BLE communication with no BLE terminal. This state is shown in FIG. 15A. When the power transfer into the BLE terminal 3-1 is completed, next, the AP 1 performs the BLE communication with the BLE terminals 3-1, 3-2, and 3-3 in this order (A71, A72, and A73 in FIG. 14A). During the BLE communication, the AP 1 performs the wireless power transfer into no BLE terminal. This state is shown in FIG. 15B. When the BLE communication is completed, next, the AP 1 performs the wireless power transfer into the BLE terminal 3-2. During the wireless power transfer into the BLE terminal 3-2, the AP 1 performs the BLE communication with no BLE terminal. When the power transfer into the BLE terminal 3-2 is completed, next, the AP 1 performs the BLE communication with the BLE terminals 3-1, 3-2, and 3-3 in this order. When the BLE communication is completed, next, the AP 1 performs the wireless power transfer into the BLE terminal 3-3. During the wireless power transfer into the BLE terminal 3-3, the AP 1 performs the BLE communication with no BLE terminal (not shown). Subsequently, the similar operation is repeated.

Figure 16:
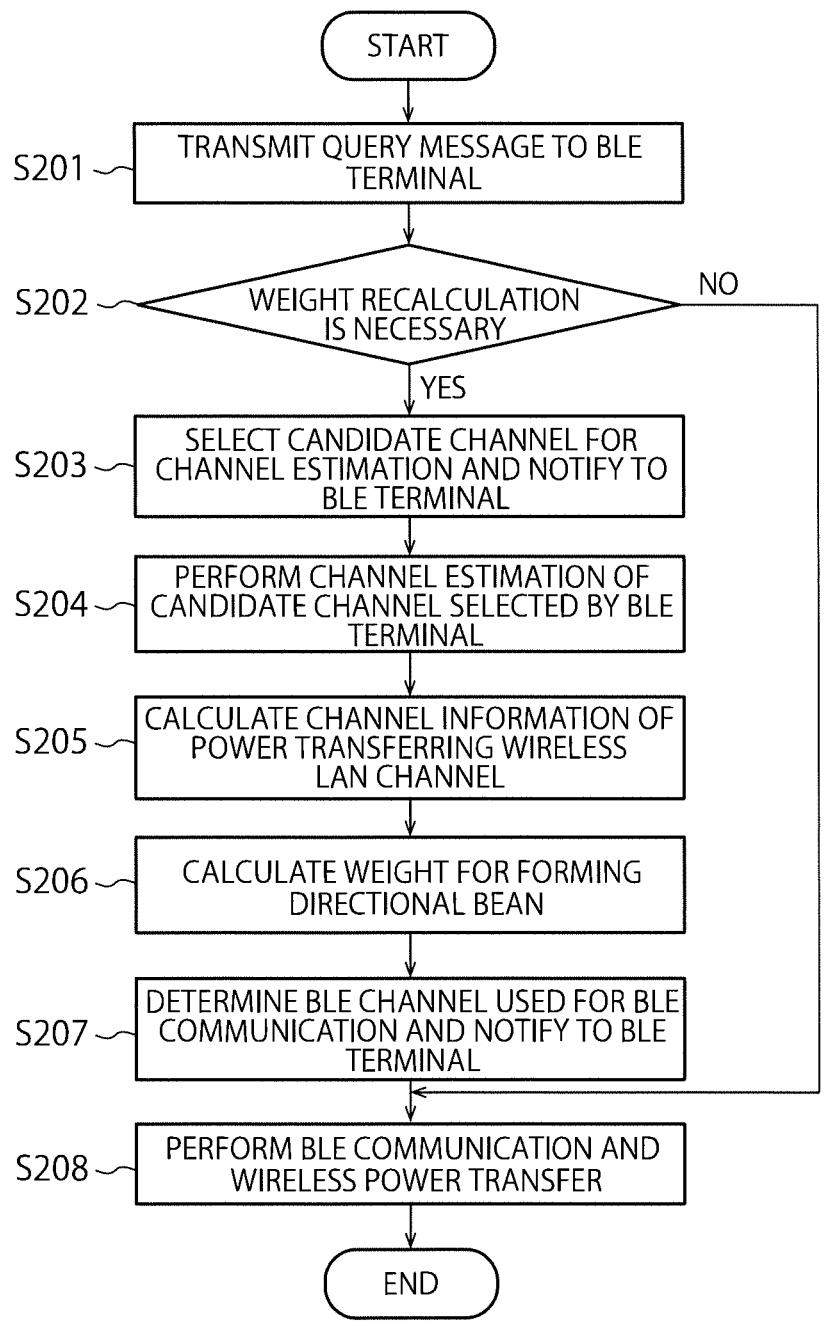
FIG. 16 is a flowchart of an operation of an AP according to the embodiment.

FIG. 16 shows a flowchart of an operation of the AP according to the embodiment. The AP 1 transmits to the BLE terminal 3 a query message requesting to transmit a device state information required for determining necessity for weight calculation or recalculation (hereinafter, referred to as recalculation) (S201).

The AP 1 determines whether or not the weight recalculation for the BLE terminal 3 is necessary on the basis of the device state information received from the BLE terminal 3 (S202). If determining not necessary (NO at S202), the last weight is used to perform the BLE communication and the wireless power transfer (S208). The case where the weight recalculation is necessary can be variously considered and examples thereof include a case where the power transfer efficiency from the AP 1 to the BLE terminal 3 falls below a threshold, a case where an explicit request is received from the BLE terminal 3, a case where the power transfer environment (communication environment) changes, and a case where a certain time period elapses. If the determination is made based on the case where a certain time period elapses, the transmission of the query message may be omitted. In the case of determining that the weight recalculation is not necessary, a BLE channel determination process (S207) described later may be carried out before proceeding to step S208.

On the other hand, if the AP 1 determines that the weight recalculation for the BLE terminal 3 is necessary (YES at S202), it selects one or more BLE channels as the candidate channels for the channel estimation from among a plurality of BLE channels belonging to the band of the power transferring channel (e.g., wireless LAN channel Ch1) (S203). The AP 1 transmits the information (list information) representing the identifiers of the selected candidate channels to the BLE terminal 3 by way of the BLE (S203 also). The BLE terminal 3 transmits the known signal using each of the candidate channels selected from the list information.

The AP 1 receives the known signal transmitted from the BLE terminal 3 and performs the channel estimation on the basis of the received known signal to acquire the channel information of the candidate channel (BLE channel) through which the relevant known signal is transmitted (S204).

The AP 1 calculates the channel information of the power transferring channel (wireless LAN channel Ch1) on the basis of the channel information of the candidate channel (S205). As an example, as described above, calculated are the average values of the channel information of the candidate channels (the average value of the amplitude variation and the average value of the phase variation). Alternatively, the weighting average of the channel information of the candidate channels may be used, or the channel information of one representative channel selected from the candidate channels may be adopted as the channel information of the power transferring channel (wireless LAN channel Ch1).

The AP 1 calculates the weight for forming the directivity directed to the BLE terminal for each of a plurality of wireless LAN antennas 14 on the basis of the channel information of the wireless LAN channel Ch1 (S206). The AP 1 performs the later transmission of the power transfer signal to the BLE terminal with the directional beam on the basis of the weight. Concretely, the arithmetic is made for the transmission signal and weight for each antenna 14, and the signal after the arithmetic may be transmitted from the antenna 14 (transmission beam forming). Alternatively, in the case of the phased array antenna, the phase shifter setting corresponding to each antenna element may be adjusted (array adjustment) on the basis of the weight.

The AP 1 determines with respect to the BLE terminal 3 the BLE channel used for the BLE data communication. Concretely, the AP 1 notifies the hopping channel information specifying the determined BLE channel to the BLE terminal 3 (S207).

The AP 1 uses the BLE channel notified for data communication to perform the BLE data communication with the BLE terminal 3 (S208). In power transferring into the BLE terminal 3, the AP 1 transmits the power transfer signal whose directivity is directed to the BLE terminal on the basis of the weight calculated at step S206 or the last calculated weight. This enables the efficient power transfer (S208 also). The period for performing the BLE data communication and the period for performing the power transfer may be arbitrarily scheduled by the AP 1.

As described above, according to the embodiment, the efficient power transfer can be made for the wireless communication device (wireless communication device of the BLE terminal) which utilizes the frequency channel having a narrow band (BLE channel) for communication. In other words, the efficient power transfer is enabled by transmitting the power transfer signal of a channel width of the wireless LAN (wireless LAN channel) with the directivity being directed to the BLE terminal. Although the channel information of the wireless LAN channel for forming the directivity needs to be acquired, the method is provided for acquiring the relevant channel information by utilizing the channel estimation result of the BLE channel, which makes it possible to acquire the channel information of the wireless LAN channel without the need to add a new function to the BLE terminal. In this way, in the embodiment, the BLE channel is used for two ways that is the acquisition of the channel information of the power transferring channel and the BLE communication.

In the embodiment described above, the channel estimation is performed by the AP 1, but may be by the BLE terminal 3. In this case, the AP 1 transmits the known signal in each candidate channel (BLE channel), and the BLE terminal 3 performs the channel estimation of each candidate channel on the basis of the known signal received from the AP 1. The BLE terminal 3 transmits the channel information that is the channel estimation result of each candidate channel to the AP 1. The AP 1 calculates the channel information of the power transferring channel on the basis of the channel information of each candidate channel. In this case, downlink channel information from the AP 1 to the BLE terminal can be acquired, which makes it possible to form more proper directivity directed to the BLE terminal 3 for transmitting the power transfer signal. In the case of this configuration, the controller 36 of the BLE terminal 3 needs to have a function to perform the channel estimation. In this way, even a configuration in which the BLE terminal 3 performs the channel estimation can also give the effect of the embodiment. In the embodiment, the AP 1 performing a process for the channel estimation may refer to any of the case where the BLE terminal transmits the known signal to the AP 1 and the AP 1 performs the channel estimation on the basis of the known signal and the case where the AP 1 transmits the known signal to the BLE terminal and the BLE terminal performs the channel estimation on the basis of the known signal.

Second Embodiment

Figure 17:
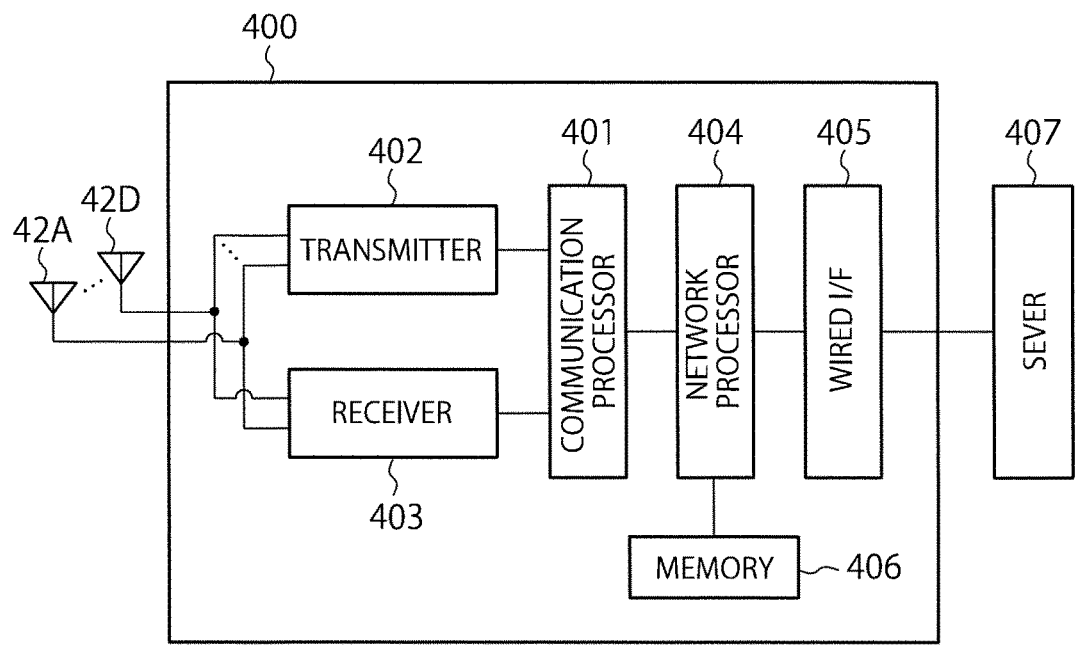
FIG. 17 is a functional block diagram of an access point or terminal.

FIG. 17 is a functional block diagram of a base station (access point) 400 according to the present embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. At least a former of the communication processor 401 and the network processor 404 has functions similar to the controller in the first embodiment. The transmitter 402 and the receiver 403 have functions similar to the transmitter and the receiver described in the first embodiment. Alternatively, the transmitter 402 and the receiver 403 may perform analog domain processing in the transmitter and the receiver and the network processor 404 may perform digital domain processing in the transmitter and the receiver in the first embodiment. The network processor 404 has functions similar to the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program)

by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to seventh embodiments may be cached in the memory 406. The frame transmitted by the base station in the first to seventh embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal, The base station (access point) according to the present invention can be applied for the base station in the above-stated any embodiment. In the present embodiment, although the base station with the cache function is described, a terminal (STA) with the cache function can also be realized by the same block configuration as FIG. 17. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

Third Embodiment

Figure 18:
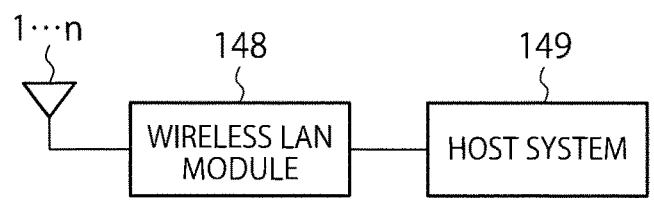
FIG. 18 is a diagram showing an exemplary overall configuration of a terminal or access point.

FIG. 18 shows an example of entire configuration of a terminal (WLAN terminal) or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 19:
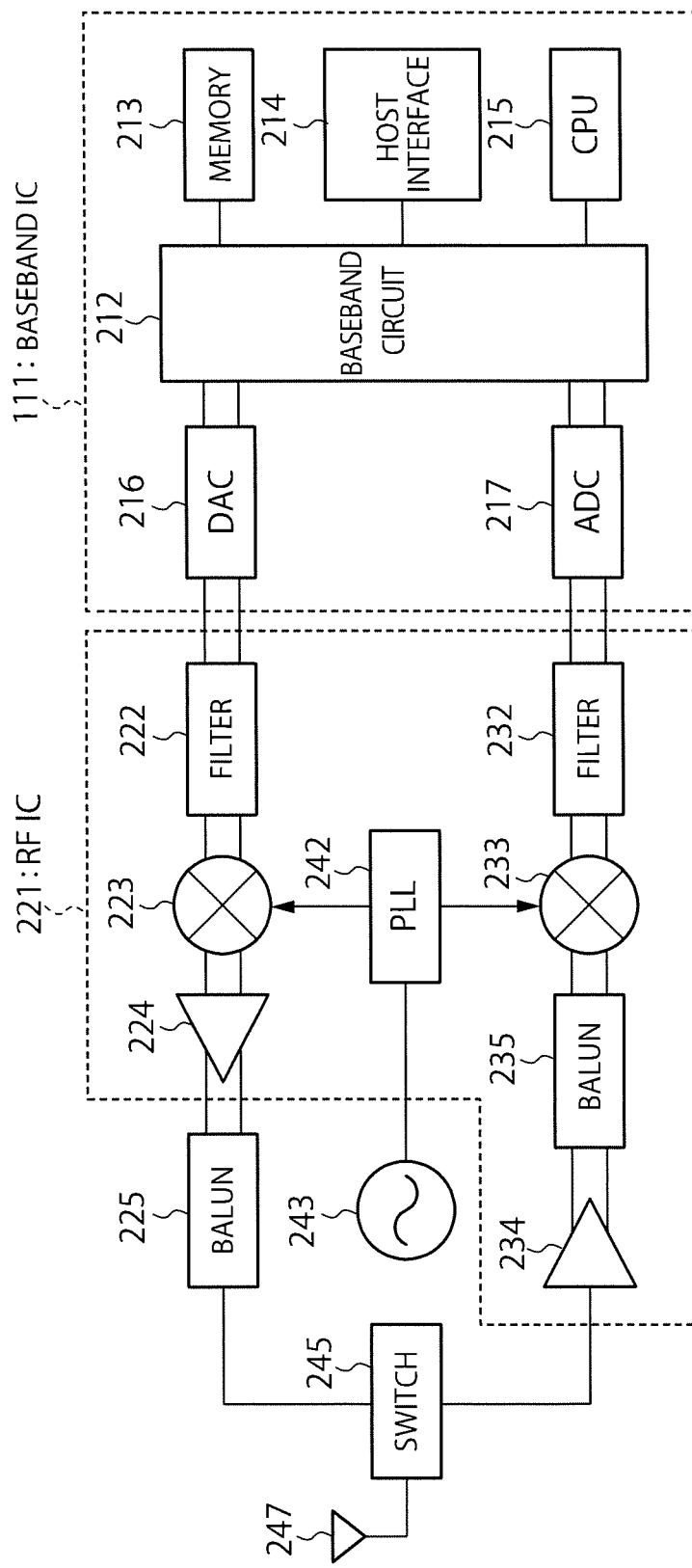
FIG. 19 is a diagram showing an exemplary hardware configuration of a wireless communication device equipped in an access point or terminal.

FIG. 19 shows an example of hardware configuration of an access point (base station), a WLAN terminal or a BLE terminal. When the WLAN and the BLE terminal are both provided, the configuration shown in the figure may be provided for each case and may be mounted. The functions of the WLAN and BLE may be mounted in one chip or may be arranged in a dispersed manner in different chips. All of elements shown in the figure are not required to be provided, a part of elements may be omitted or replaced, and another element may be added.

In the configuration shown in figure, at least one antenna 247 is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The antenna 247 may be a phased array antenna or a directivity variable antenna.

Fourth Embodiment

Figure 20:
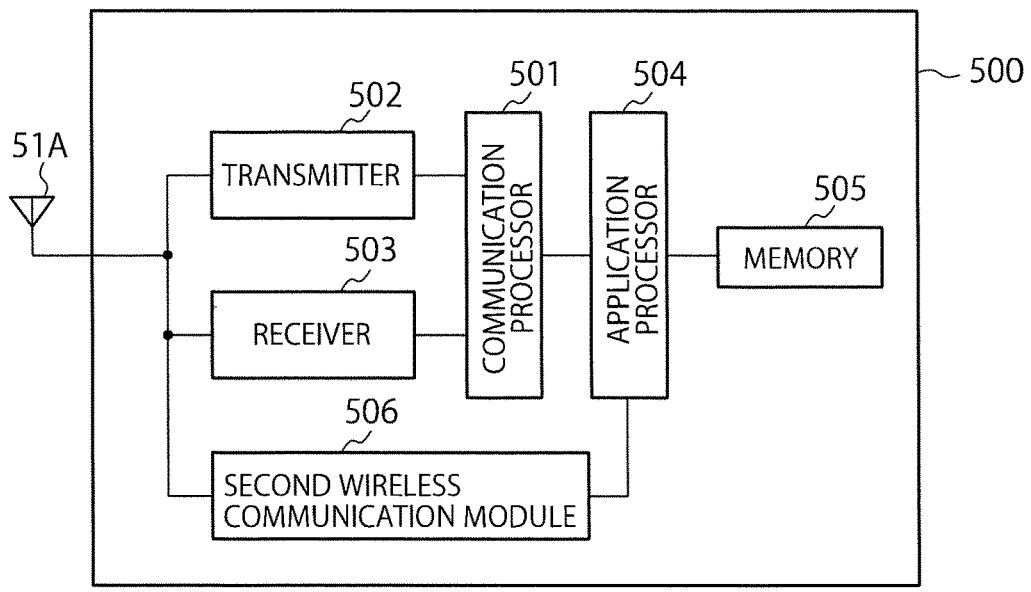
FIG. 20 is a functional block diagram of a terminal or access point.

FIG. 20 is a functional block diagram of the terminal (STA) 500 according to a fourth embodiment. The STA 500 includes a communication processor 501, a transmitter 502, a receiver 503, an antenna 51A, an application processor 504 a memory 505, and a second wireless communication module 506. The base station (AP) may have the similar configuration.

The communication processor 501 has the functions similar to the controller as described in the first embodiment. The transmitter 502 and the receiver 503 have the functions similar to the transmitter and the receiver as described in the first embodiment. The transmitter 502 and the receiver 503 may perform analog domain processing in the transmitter and the receiver as described in the first embodiment and the communication processor 501 may perform digital domain processing in the transmitter and the receiver as described in the first embodiment. The communication processor 501 may internally possess a buffer for transferring data to and from the application processor 504. The buffer may be a volatile memory, such as an SRAM or a DRAM, or may be a non-volatile memory, such as a NAND or an MRAM.

The application processor 504 performs wireless communication through the communication processor 501, data writing or reading with the memory 505 and wireless communication through the second wireless communication module 506. The application processor 504 performs various processing such as Web browsing or multimedia processing of video or music or the like. The operation of application processor 504 may be carried out by software (program) processing by a processor such as CPU, by hardware, or both of them.

The memory 505 saves data received at the receiver 503 or the second wireless communication module 506, or data processed by the application processor 504. The memory 505 may be a volatile memory such as a DRAM or may be a non-volatile memory, such as a NAND or an MRAM. The memory 505 may be an SSD, an HDD, an SD card, or an eMMC or the like. The memory 505 may be arranged out of the access point 500.

The second wireless communication module 506 have the similar configuration to the WLAN module as shown in FIG. 18 or FIG. 19 as one example. The second wireless communication module 506 performs wireless communication in a different manner than that realized by the communication processor 501, the transmitter 502 and the receiver 503. For example, in a case that the communication processor 501, the transmitter 502 and the receiver 503 perform wireless communication in compliance with IEEE802.11 standard, the second wireless communication module 506 may perform wireless communication in compliance with another wireless communication standard such as Bluetooth (trademark), LTE, Wireless HD or the like. The communication processor 501, the transmitter 502, the receiver 503 may perform wireless communication at 2.4 GHz/5 GHz and the second wireless communication module 506 may perform wireless communication at 60 GHz.

In the embodiment, one antenna is arranged and shared by the transmitter 502, the receiver 503 and the second wireless communication module 506. A switch controlling for connection destination of the antenna 51A may be arranged and thereby the antenna may be shared. A plurality of antennas may be arranged and may be employed by the transmitter 502, the receiver 503, and the second wireless communication module 506, respectively.

As one example, the communication processor 501 corresponds to an integrated circuit, and the transmitter 502 and the receiver 503 corresponds to an RF integrated circuit which transmits and receives frames. A set of the communication processor 501 and the application processor 504 is configured by one integrated circuit (1 chip). A part of the second wireless communication module 506 and the application processor 504 may be configured by one integrated circuit (1 chip).

The application processor performs control of wireless communication through the communication processor 501 and wireless communication through the second wireless communication module 506.

Fifth Embodiment

Figure 21A:
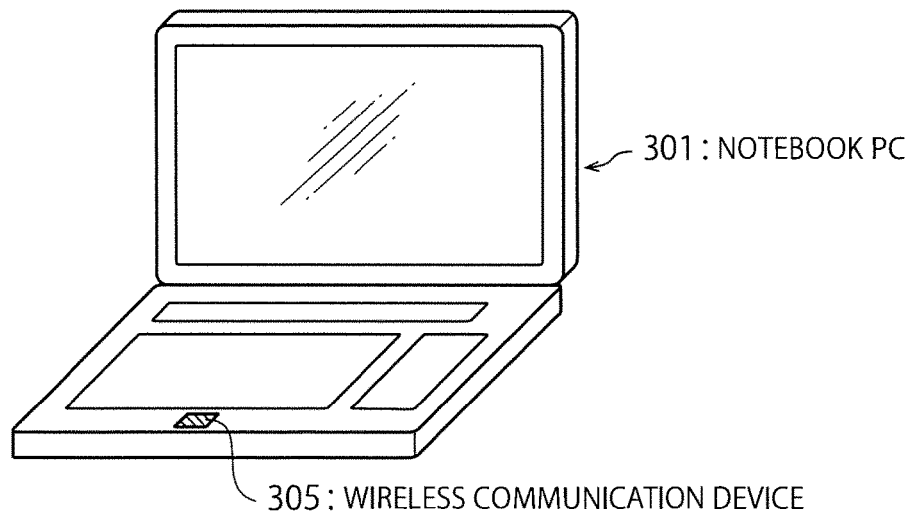
FIG. 21A and FIG. 21B are each a perspective view of a terminal according to the embodiment of the invention.
Figure 21B:
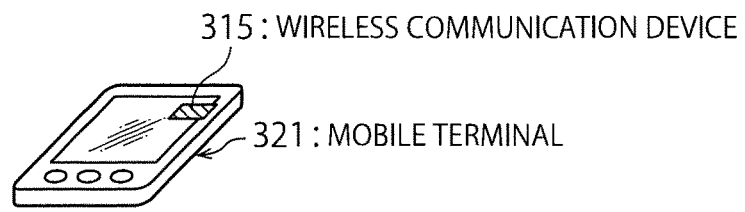

FIG. 21A and FIG. 21B are perspective views of wireless terminal according to the third embodiment. The wireless terminal in FIG. 21A is a notebook PC 301 and the wireless communication device (or a wireless device) in FIG. 21B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 22:
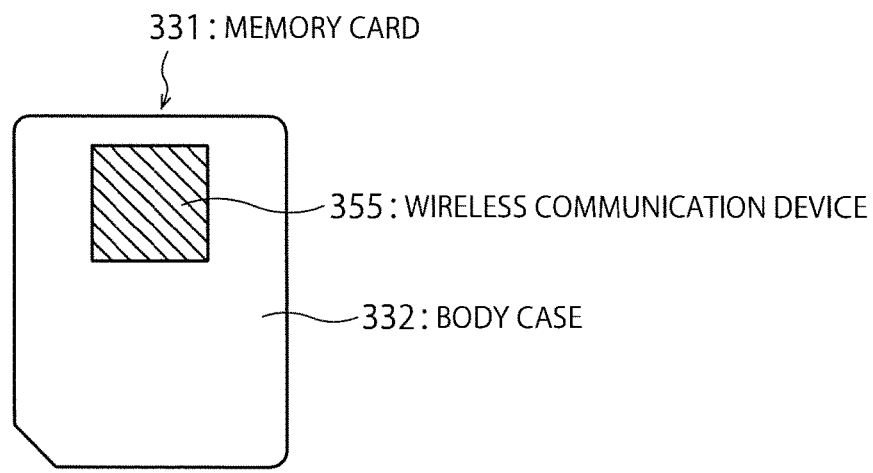
FIG. 22 is a diagram showing a memory card according to the embodiment of the invention.

Moreover, a wireless communication device installed in a terminal (which may indicate a base station) can also be provided in a memory card. FIG. 22 illustrates an example of a wireless communication device mounted on a memory card. A memory card 331 contains a wireless communication device 355 and a body case 332. The memory card 331 uses the wireless communication device 355 for wireless communication with external devices. Here, in FIG. 22, the description of other installed elements (for example, a memory, and so on) in the memory card 331 is omitted.

Sixth Embodiment

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Seventh Embodiment

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Eighth Embodiment

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Ninth Embodiment

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Tenth Embodiment

In the present embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Eleventh Embodiment

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Twelfth Embodiment

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Thirteenth Embodiment

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Fourteenth Embodiment

In the present embodiment, [1] the frame type in the wireless communication system, [2] a technique of discon-nection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 23:
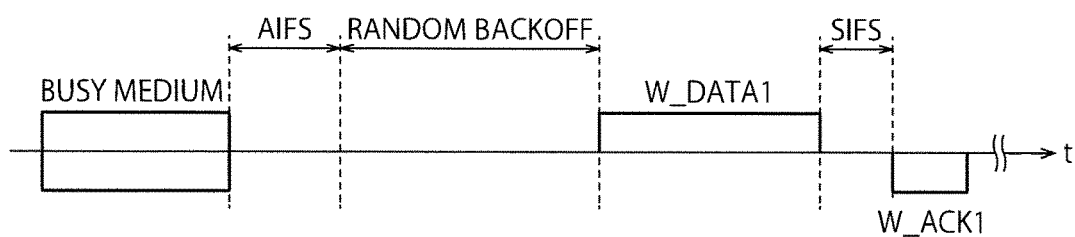
FIG. 23 is a diagram showing an example of frame exchange during a contention period.

Here, FIG. 23 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller (controlling circuitry), a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device comprising:
   a communicator configured to communicate through a first frequency channel of first frequency channels;
   a transmitter configured to transmit a signal of wireless power transfer to a first wireless communication device through a second frequency channel; and
   controlling circuitry configured to estimate a first state of at least one of the first frequency channels, wherein
   the controlling circuitry is configured to estimate a second state of the second frequency channel based on the first state of at least one of the first frequency channels and control a directivity of the signal on the basis of the second state of the second frequency channel.

2. The wireless communication device according to claim 1, wherein
   while the transmitter is configured to transmit the signal of wireless power transfer, the communicator is configured to communicate with a second wireless communication device through at least one of third frequency channels which does not overlap the second frequency channel.

3. The wireless communication device according to claim 2, wherein
   the communicator is configured to communicate by frequency hopping of the third frequency channels.

4. The wireless communication device according to claim 1, wherein
   the transmitter is configured to transmit the signal of wireless power transfer during a period of time in which the communicator does not communicate.

5. The wireless communication device according to claim 4, wherein,
   the communicator is configured to communicate by frequency hopping of the first frequency channels.

6. The wireless communication device according to claim 1, wherein
   the controlling circuitry is configured to select two or more of the first frequency channels and estimate first states of the selected first frequency channels, and is configured to estimate the second state of the second frequency channel based on the first states of the selected first frequency channels.

7. The wireless communication device according to claim 1, wherein
   the communicator is configured to transmit information specifying the least one of the first frequency channels to the first wireless communication device,
   the communicator is configured to receive a first signal for channel estimation via the specified first frequency channel from the first wireless communication device, and
   the controlling circuitry is configured to estimate the first state on the basis of the received first signal for channel estimation.

8. The wireless communication device according to claim 7, wherein
   the communicator is configured to select two or more first frequency channels and transmit information specifying the selected first frequency channels to the first wireless communication device,
   the communicator is configured to receive a second signal for channel estimation from the first wireless communication device via the specified first frequency channels, and
   the controlling circuitry is configured to estimate first states of the selected first frequency channels on the basis of the received second signal for channel estimation and estimate the second state on the basis of the first states.

9. The wireless communication device according to claim 1, wherein
   a frequency hand of the second frequency channel overlaps frequency bands of the first frequency channels.

10. The wireless communication device according to claim 9, wherein
    in a case that a predefined condition regarding the wireless power transfer is met, the controlling circuitry is configured to estimate the first state of the at least one of the first frequency channels.

11. The wireless communication device according to claim 10, wherein
    the predefined condition is a condition regarding a remaining battery charge of the first wireless communication device, a condition regarding a wireless power transfer efficiency to the first wireless communication device, or a condition regarding a wireless power transfer environment.

12. The wireless communication device according to claim 1, wherein
    the controlling circuitry is configured to calculate a weight for each of a plurality of antennas on the basis of the second state and the transmitter is configured to transmit the signal of wireless power transfer by forming a beam based on the weight.

13. The wireless communication device according to claim 1, further comprising a phased array antenna, wherein
    the controlling circuitry is configured to adjust setting of the phased array antenna on the basis of the second state.

14. A wireless communication method comprising:
    communicating through a first frequency channel of first frequency channels;
    transmitting a signal of wireless power transfer to a first wireless communication device through a second frequency channel;
    estimating a first state of at least one of the first frequency channels;
    estimating a second state of the second frequency channels based on the first state of at least one of the first frequency channels; and
    controlling a directivity of the signal on the basis of the second state of the second frequency channel.

15. The wireless communication method according to claim 14, comprising:
    communicating with a second wireless communication device through at least one of third frequency channels which does not overlap the second frequency channel during a period when the signal of wireless power transfer is transmitted.

16. The wireless communication method according to claim 15, comprising:
    communicating by frequency hopping of the first frequency channels.

17. The wireless communication method according to claim 14, comprising:
    transmitting of wireless power transfer during a period of time in which the communicator does not communicate.

18. The wireless communication method according to claim 17, comprising:

communicating by frequency hopping of the first frequency channels.

19. The wireless communication method according to claim 14, comprising:

selecting two or more of the first frequency channels;

estimating first states of the selected first frequency channels; and estimating the second state of the second frequency channel based on the first states of the selected first frequency channels.

20. The wireless communication method according to claim 14, comprising:

transmitting information specifying the at least one of the first frequency channels; and receiving a signal for channel estimation via the specified first frequency channel from the first wireless communication device; and estimating the first state on the basis of the received signal for channel estimation.

\* \* \* \* \*